H. P. RANKIN.
MEAT-CHOPPER.
No. 186,165. Patented Jan. 9, 1877.
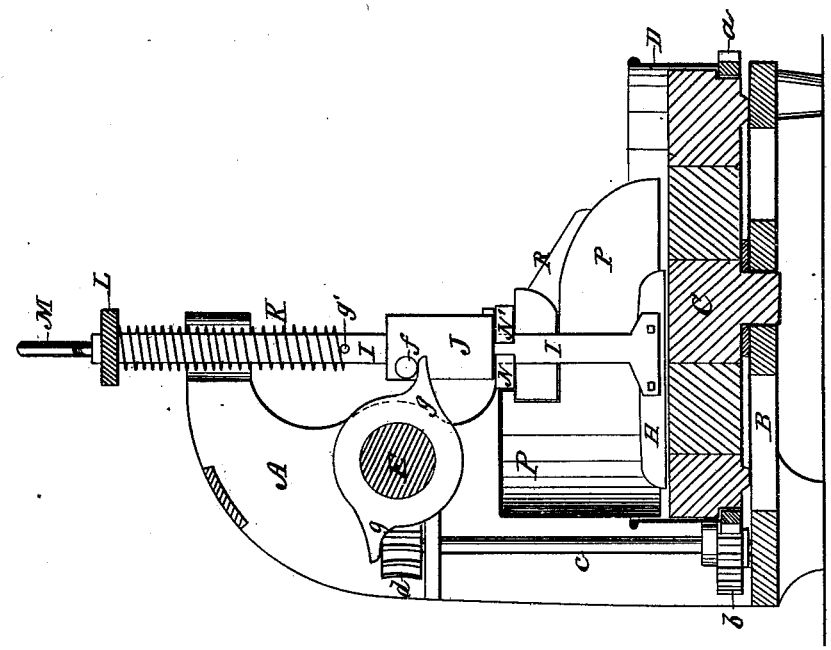
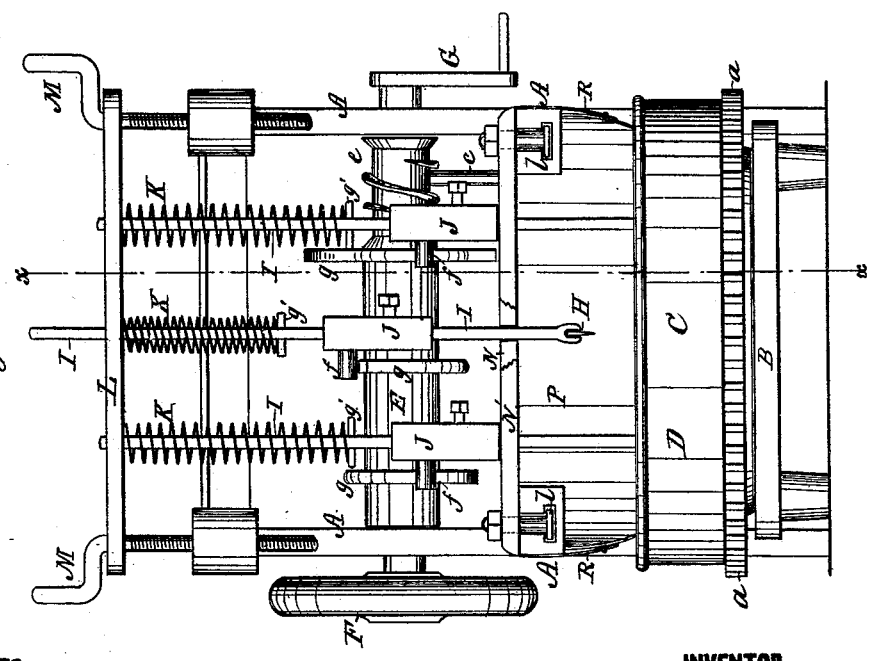
WITNESSES:
W. W. Hollingsworth
T. S. West
INVENTOR:
H. P. Rankin
BY
ATTORNEYS.

UNITED STATES PATENT OFFICE.

HUGH P. RANKIN, OF ALLEGHENY, PENNSYLVANIA.

IMPROVEMENT IN MEAT-CHOPPERS.

Specification forming part of Letters Patent No. 186,165, dated January 9, 1877; application filed June 16, 1876.

*To all whom it may concern:*

Be it known that I, HUGH P. RANKIN, of the city and county of Allegheny, and State of Pennsylvania, have invented a new and Improved Meat-Chopper; and I do hereby declare that the following is a full, clear, and exact description of the same, reference being had to the accompanying drawing, forming part of this specification, in which—

Figure 1 is a front elevation; Fig. 2, a vertical section through line $x\ x$.

My invention relates to certain improvements in that class of meat-choppers in which a series of cutters are successively lifted by a shaft provided with cams, and allowed to chop the meat upon a rotating table from the tension of separate springs which force the cutters downwardly when the cams leave the lift-bars carrying the cutters. It consists principally in the means for regulating the downward stroke of the knives, to prevent them from rapidly chopping up, and wearing out, the wooden table, as hereinafter more fully described.

In the drawing, A represents the upright frame, and B the bed-plate, of the machine, which together carry all of the operating parts. C is the rotating table, arranged upon a vertical central pivot in the bed-plate, and constructed, as usual, of blocks of wood, with the grain in line with the movement of the cutters. Said table is provided with a metallic rim or band, D, upon its periphery, which projects above the surface of the table, so as to hold the meat, and which is made removable to facilitate the cleansing of the table. Upon the lower part of the table is arranged a gearing of teeth, $a$, which mesh with a pinion, $b$, upon the upright shaft $c$ in the rear, which shaft is journaled in bearings in the frame-work, and carries at the top a second pinion, $d$, with which engages a worm, $e$, upon the main drive-shaft. This mechanism serves, when the cutters are operated by the main shaft, to rotate the table, so as to bring successively different portions of the meat beneath the knives. E is the main drive-shaft, which is journaled horizontally in bearings in the upright portion of the frame-work, and carries at one end a fly-wheel, F, and at the other a crank, G, or other means for applying the power. H are the chopping-knives, which are fastened to the lower ends of the lift-bars I, and are arranged parallel to each other, instead of radially, so that, in the rotation of the table, the lines of their respective cuts may cross each other, and thus mince the meat more perfectly. The lift-bars I are provided with shoulders J, having lateral projections $f$, and the main shaft is provided with double cams $g$, one for each lift-bar, and so arranged that, in the revolution of said shaft, they catch beneath the projections $f$ of the shoulders on the lift-bars, and thus successively elevate the knives into a position from which they are forced downwardly upon the meat on the table by spiral springs K whenever the cams pass by said projections. The spiral springs are wound about the upper portions of the lift-bars, and bear at the upper end against a bar, L, and at their lower ends against cross-pins $g'$. The upper ends of the lift-bars project through guide-holes in the bar L, and the latter is made vertically adjustable by crank-screws M, passing through the upper ends of the frame, so as to regulate the tension of the springs K. The lower ends of the lift-bars are guided in their movements by the stop-bars N N', which extend across from side to side of the frame-work and form a support upon which the shoulders J rest, to limit the downward stroke of the knives, and thus prevent the rapid chopping and wearing away of the blocks forming the table.

It is obvious that, when the machine is run at the high rate of speed of several hundred revolutions a minute, if the table be not protected from the action of the knives it would soon become worn away, and cause also an admixture of wood with the sausage-meat. The function, therefore, of this stop-bar is important.

When the table becomes worn it will be necessary to set the knives a little lower in order to make a perfect cut, and to do this the shoulders J are adjustably attached to the lift-bars by binding-screws, which arrangement permits the lowering of the knives without changing the position of the shoulders, which is absolutely necessary in this form of machine, for the reason that as the shoulders rest upon the stationary stop-bar they could not be lowered, and if they could be it would remove the projections $f$ of the shoulders from their proper positions to be struck by the cams of the main shaft.

In order to facilitate the removal of the knives and lift-bars, when it is desired to sharpen the former, one of the stop-bars, N', is made removable, so that when it is taken away, and the bar L at the top is elevated, the knives and lift-bars may be taken out together, and the knives ground without removing them from their respective bars.

To hold the removable stop-bar N' in place, the side frames A A are slotted with an inverted T-slot, to receive the head of a bolt, $l$, and allow its shank to project through bar N', so as to receive a nut, which clamps and fastens said bar.

In running the machine, as thus described, at a high rate of speed, the momentum of filaments of meat which adhere to the reciprocating cutters cause them to be thrown up into the machinery, so as to foul the same and obstruct its operation, and foul matter of this kind, together with grease or oil, is liable to fall into the meat on the table.

To obviate this objection a hood or cover, P, made of sheet metal, is fastened to the main frame through supports R, and allowed to project inside and below the upper edge of the revolving table. This cover may be extended entirely across the table, and, being located between the table and the operating mechanism, it prevents the fouling of said mechanism by the thrown-out filaments of meat, and also prevents foreign bodies from falling into the table and deranging the knives.

Having thus described my invention, what I claim as new is—

1. The combination, with the lift-bars, carrying the knives and adjustable shoulders J, of a stop-bar, N, arranged to support the shoulders, and limit the downward movement of the chopping-knives, as and for the purpose described.

2. The combination of the lift-bars I carrying knives H, with the adjustable bar L, having crank-screws M, and the stop-bar N, having a removable portion, N', substantially as and for the purpose described.

HUGH P. RANKIN.

Witnesses:
D. NEILLIE,
N. J. RANKIN.